United States Patent [19]

Kuesters et al.

[11] 4,307,650
[45] Dec. 29, 1981

[54] WEAPONS SYSTEM FOR THE BALLISTIC AND GUIDED ATTACK ON MULTIPLE TARGETS, ESPECIALLY BY AN AIRCRAFT

[75] Inventors: Manfred Kuesters, Ottobrunn; Werner Lehmann, Germering, both of Fed. Rep. of Germany

[73] Assignee: Messerschmitt-Boelkow-Blohm Gesellschaft mit beschraenkter Haftung, Munich, Fed. Rep. of Germany

[21] Appl. No.: 49,595

[22] Filed: Jun. 18, 1979

[30] Foreign Application Priority Data

Jul. 5, 1978 [DE] Fed. Rep. of Germany ....... 2829451
Jul. 7, 1978 [DE] Fed. Rep. of Germany ....... 2829934

[51] Int. Cl.³ .............................................. F41F 3/06
[52] U.S. Cl. .................................. 89/1.5 E; 89/1.814; 89/1.815; 89/1.816; 89/37.5 E
[58] Field of Search .................... 89/1.5 R, 1.5 E, 1.7, 89/1.701, 1.8, 1.814, 1.815, 1.816, 1.819, 37.5 R, 37.5 E, 41 EA

[56] References Cited

U.S. PATENT DOCUMENTS

| | | | |
|---|---|---|---|
| 2,373,990 | 4/1945 | Barnhart | 89/37.5 R |
| 2,820,397 | 1/1958 | Durkin | 89/1.5 R |
| 2,930,288 | 3/1960 | Jonah | 89/37.5 R |
| 2,938,434 | 5/1960 | Myron | 89/1.815 |
| 3,018,692 | 1/1962 | Bilek | 89/1.815 |
| 3,048,087 | 8/1962 | Campbell | 89/1.815 |
| 3,766,828 | 10/1973 | Cords | 89/1.8 |

*Primary Examiner*—Stephen C. Bentley
*Attorney, Agent, or Firm*—W. G. Fasse; D. F. Gould

[57] ABSTRACT

The present weapons system enables an aircraft to attack simultaneously a plurality of targets in an aimed, guided manner by a like plurality of small missiles or projectiles. For this purpose the missiles are carried in a rotatable drum type platform comprising respective launching tubes. The firing control system of the aircraft includes a computer which takes into account automatically the target coordinates and other data for selecting that missile which is most suitable for a particular target, whereby the rotatable platform requires a minimum of rotation for aiming the missile with a proper lead factor at the respective target. The missile is then automatically fired without any need of the aircraft heading toward the target.

10 Claims, 7 Drawing Figures

WEAPONS SYSTEM FOR THE BALLISTIC AND GUIDED ATTACK ON MULTIPLE TARGETS, ESPECIALLY BY AN AIRCRAFT

BACKGROUND OF THE INVENTION

The present invention relates to a weapons system for the ballistic and guided attack on multiple targets, especially by an aircraft such as a combat aircraft or the like. However, the system may also be installed on land vehicles, for example.

German Pat. No. 1,556,423 discloses a weapons system for attacking ground targets by a missile carrying aircraft. In the prior art system the dropped or fired missiles gain additional height after release from the aircraft, by utilizing their own kinetic energy for producing aerodynamic lift forces to bring the projectiles to an elevation above that of the aircraft. Thereafter the projectiles follow predetermined flight trajectories including looping trajectories directed opposite to that of the flight direction of the aircraft which continues on its course. The purpose of this type of weapons system is to enable the missile carrying aircraft to fly at the lowest possible altitude toward the target without coming into the destructive range of its own missiles, bombs, or the like.

In the prior art weapons system the projectiles including dropped type of weapons may propel themselves after release from the low flying aircraft toward the target thereby utilizing the inherent kinetic energy for delivering explosive loads into the target even if the carrying aircraft flys at ultrasonic speeds. These targets may be located at relatively large distances from the point of release since the inherent kinetic energy will be sufficient for propelling the weapons into the target.

U.S. Pat. No. 3,264,451 and U.S. Pat. No. 3,332,642 disclose similar systems. It is a common feature of all of these prior art weapons systems that the aircraft is required to head directly for the target at least to the point of time when the weapon is released. In the alternative it is necessary to establish orientation and release points which are rigidly part of a fixed coordinate system. Such orientation and release points permit the lateral discharge of the weapon and its lateral remote control. In the instant where the discharge involves the dropping of the weapon such as a bomb, it is not possible to attack the ground target in the so-called time multiplex fashion. In the other instance, where the remote controlled weapon is fired in an aimed manner against individual targets, the costs are too large, especially if the target is small.

U.S. Pat. No. 3,547,000 discloses a bulk material container for a scattering type of weapon. The container is secured to the underside or belly of the aircraft and the explosives are simply dumped or blown out by using the exhaust gases of the propulsion plant. However, this type of weapon is not suitable for reaching targets in an aimed manner to the right and left of the flight trajectory. This type of device also requires the aircraft to fly or head directly for the target area. Thus, the flight direction of ballistic projectiles depends on the flight direction of the aircraft, at least at the time of firing.

OBJECTS OF THE INVENTION

In view of the above it is the aim of the invention to achieve the following objects singly or in combination:

to provide a weapons system of the type mentioned which is capable of attacking multiple ground targets located laterally relative to the flight trajectory thereby providing a high accuracy and destruction probability;

to provide a weapons system which will permit the rapid firing of multiple weapons, particularly of a smaller size without requiring a flight trajectory aimed directly at the target;

to enable an aircraft to attack multiple targets simultaneously while using relatively small weapons in an aimed manner thereby even reducing the size of the aircraft;

to provide means which will enable the varying of the direction of the flight trajectory of a weapon such as a missile, independently of the flight direction of the combat aircraft;

to construct the container of a weapons system in such a manner that it may be rotated into different firing directions while permitting the firing in different directions simultaneously; and to house the weapons carrier proper in an aerodynamically shaped housing which is integrated into the aircraft body or which may be attached to the suspension means of conventional aircraft.

SUMMARY OF THE INVENTION

According to the invention there is provided a weapons system especially for combat aircraft which is characterized in that a drum type platform operating as a magazine for ballistic missiles or remote control projectiles is rotatable about an axis and which may be controlled by the firing control system of the aircraft in accordance with the target coordinates which permit the automatic selection of the weapon which is most suitable for the respective target by rotating the drum type platform into the firing position and to fire the weapon with the respective lead factor.

The just summarized features of the invention not only reduce the payload factor for the carrier aircraft relative to the number of attacked targets, it also provides the possibility or rather the capability of attacking multiple targets. By using weapons of a smaller caliber in an aimed manner, it is now possible to even use smaller tactical combat aircraft. Another advantage of the invention is seen in the improvement of the so-called scattering weapons concept. The invention avoids the aimless scattering of weapons over a large surface area in a statistical distribution. The invention employs the aimed rifle shot so to speak even against random and small targets. These features altogether increase the weapons efficiency as well as its cost effectiveness.

According to a preferred embodiment of the invention the drum type firing platform comprises an adapter structure which carries containers or firing tubes in which the weapons or projectiles are located. The containers or firing or launching tubes are rotatable about vertically extending rotational axes. This feature of the invention makes it possible to vary the flight direction of ballistic missiles relative to the flight direction of the carrier aircraft so that lateral targets may be attacked. Due to the possibility of controlling the rotatable firing tubes independently of each other, weapons may be fired simultaneously in different directions.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE PRESENT INVENTION

Figure 1:
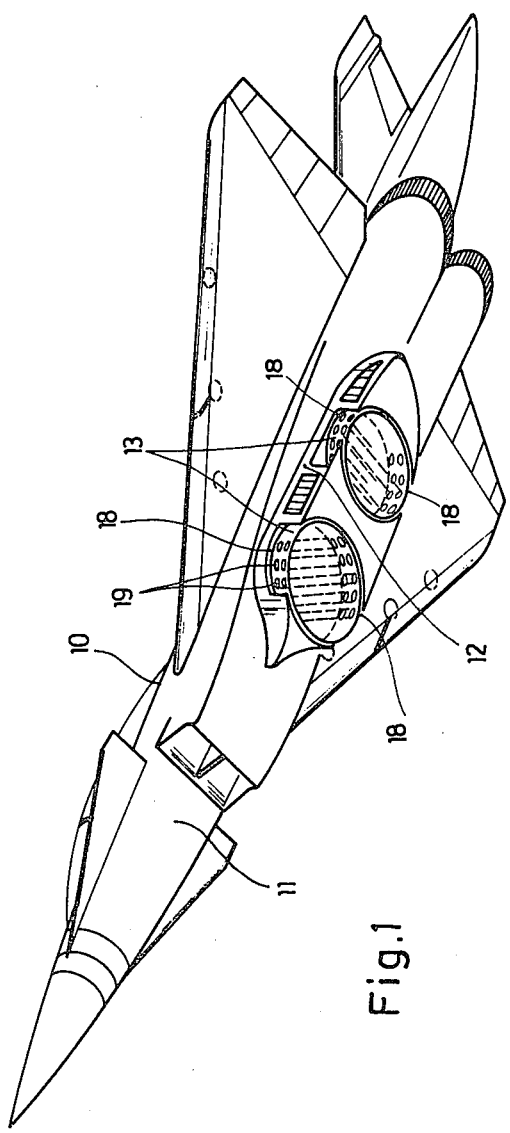
FIG. 1 is a somewhat simplified perspective view in the direction toward the bottom or belly of a combat aircraft equipped in accordance with the invention.

FIG. 1 shows the underside 11 of a combat aircraft 10. A housing 12 constructed with due regard to aerodynamic requirements, is secured to the underside or bellyside 11 of the aircraft. Two or more drum type platforms 13 are rotatably secured in the housing 12. These platforms 13 are rotatable about axes extending substantially perpendicularly to the longitudinal center axis of the aircraft. Thus, during level flight these axes will extend substantially vertically. Each platform 13 comprises a plurality of weapons launching tubes 19. These weapons are rocket driven projectiles or missiles 15 shown in FIG. 3. The arrangement and number of the launching tubes will depend on the size and other data of the ammunition employed. Moreover, one or several planes of launching tubes may be carried in one platform. In order to provide a swivelling range for these platforms 13 so as to bring the launching tubes 19 into a firing position, the housing 12 has cut-outs 18 covering, for example, a swivelling range between 20° and 125°.

Figure 2:
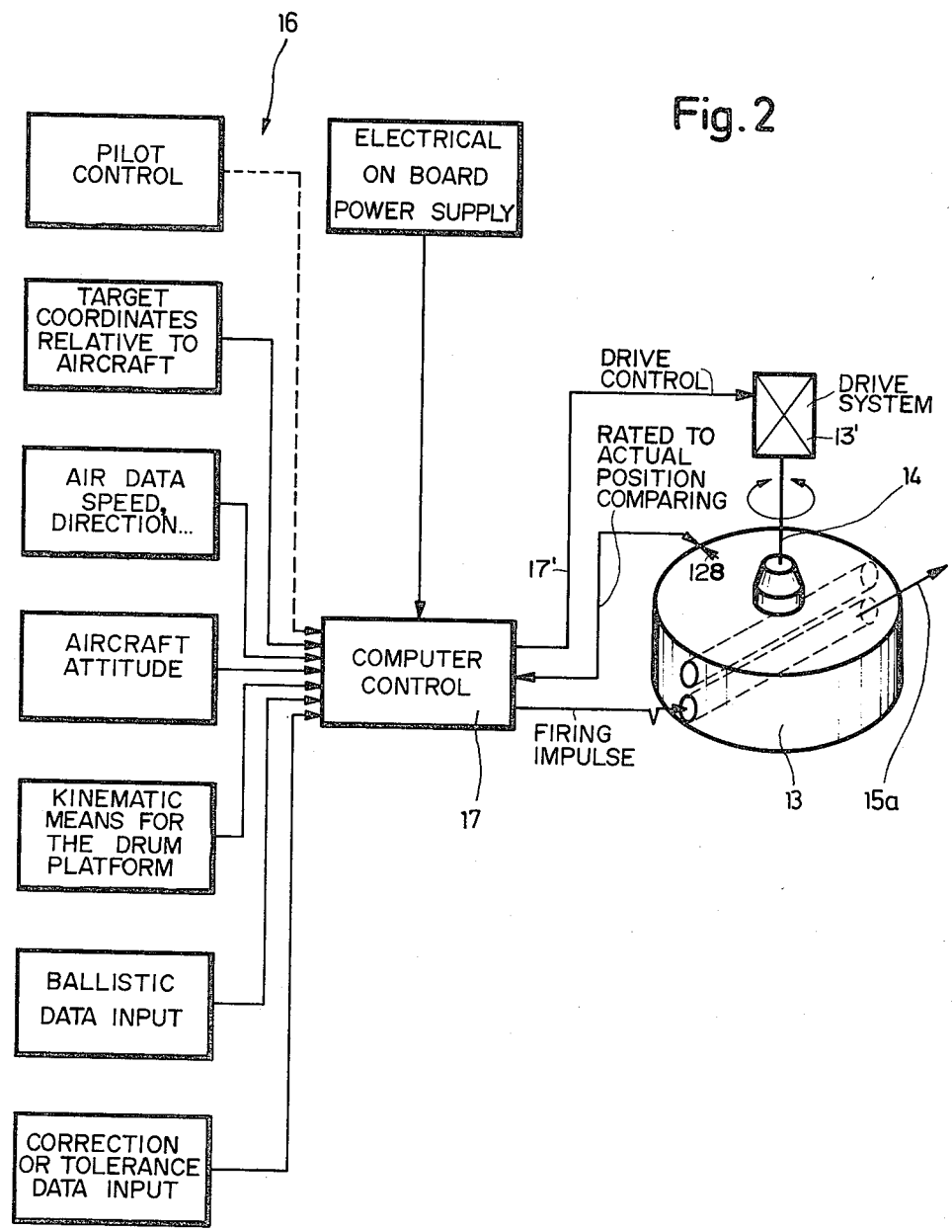
FIG. 2 is a block diagram of the weapons system according to the invention.

FIG. 2 illustrates a block diagram of the firing control system 16 of a military aircraft. The firing control system is utilized to automatically select that missile which, in accordance with the target coordinates, is most suitable for use against the respective targets as determined by the computer control 17. That ballistic rocket or missile 15a is considered to be most suitable which requires the least rotation of the platform 13 into the firing position while simultaneously providing the necessary lead factor in aiming and firing the selected missile 15a. In other words, the computer controls the firing. The computer control 17 which is connected to the electrical power supply of the aircraft, receives signals from the pilot operated controls as well as any of the other signals as indicated in FIG. 2 such as air data, target coordinates and so forth. The computer calculates the firing sequence, the firing data for the missile 15a or a plurality of missiles whereby the output 17' of the computer 17 supplies the necessary drive instructions to the drive system 13' for rotating the drum 13 about the axis 14. The computer also compares a rated drum position value with the actual drum position and provides a firing impulse to the selected missile or missiles.

Since the aircraft may also be equipped with weapon carriers underneath the wings for firing in the flight direction, the system according to the invention in combination with a conventional weapons carrier system permits the attack on any target or a plurality of targets simultaneously or in sequence within the angular firing range of the drum platform 13 and having regard to the range of the particular missile which determines a target strip to the left and right of the flight direction.

Due to the rapid firing sequence possible according to the invention and due to the large number of missiles that may be carried in a plurality of rotary drums in several tiers, the invention has substantially increased the number of ground targets that may be attacked during any particular time and during one combat mission. Simultaneously the invention substantially improves the hit and destruction probability by the use of a plurality of aimed missiles of the smallest caliber which may be remote controlled all the way into the target or during the final phase of the missile flight. Further, by using missiles of the smallest caliber, substantial weight has been saved and hence the payload factor has been increased so that combat aircraft may be even smaller as compared to prior art combat aircraft. Still another important advantage of the invention is seen in that it fully utilizes the aviation and electronic data handling capability which is installed in the aircraft anyway, whereby the cost effectiveness has been noticeably improved.

Figure 3:
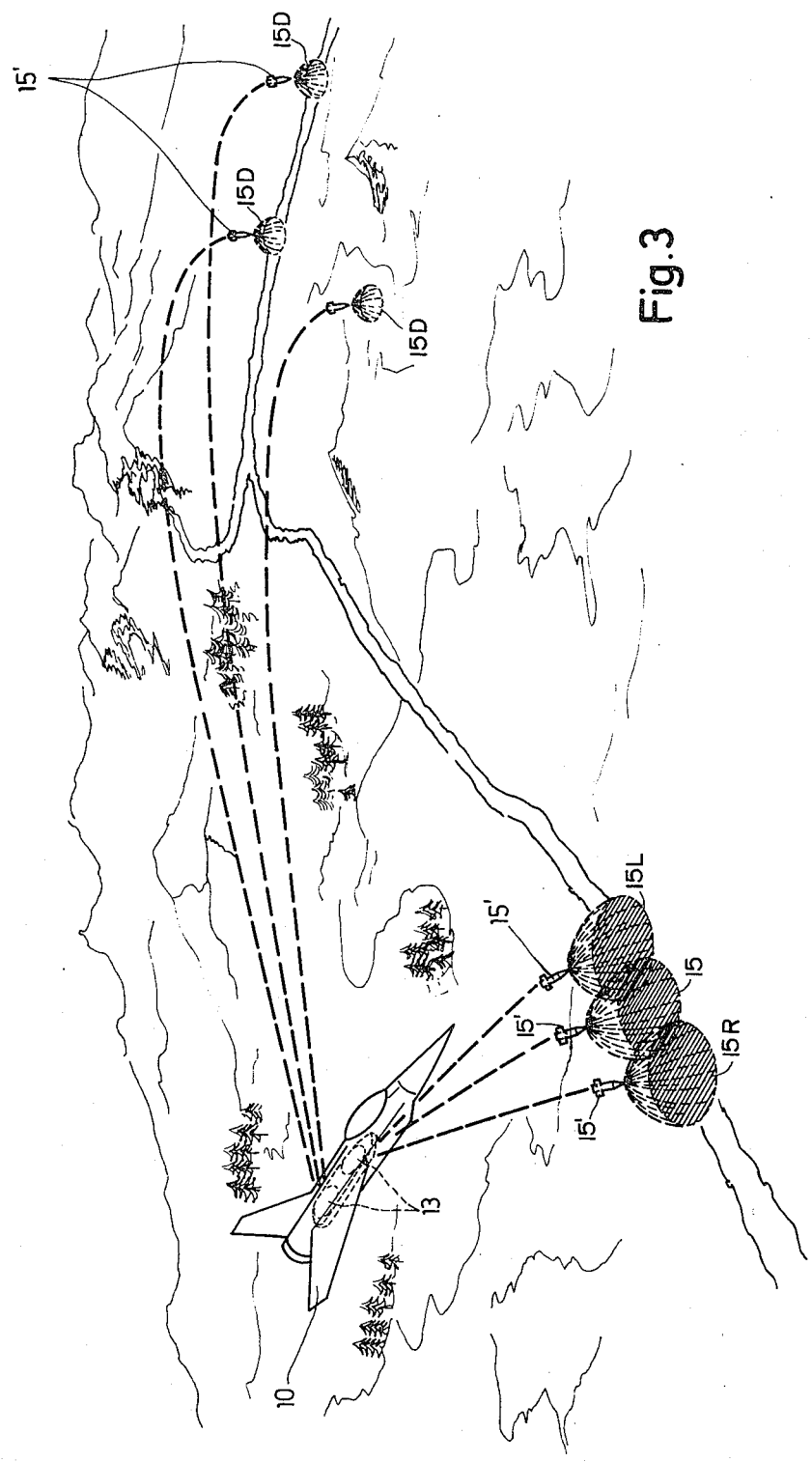
FIG. 3 illustrates an aerial view of multiple targets and a combat aircraft simultaneously attacking such multiple targets by means of a weapons system according to the invention.
Figure 4:
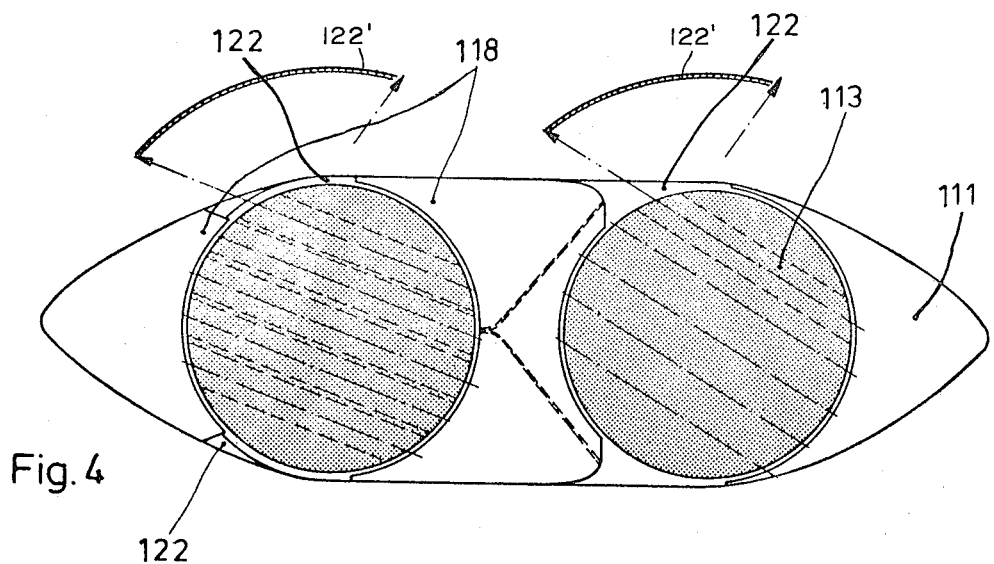
FIG. 4 is a view against the firing platform substantially in the direction of the axis of rotation of the several individual platforms as viewed in the direction of the arrow Z shown in FIG. 5.

FIG. 3 illustrates a sketch of the type resembling a picture taken by a camera carried by an aircraft. The combat aircraft 10 simultaneously attacks a target 15 substantially in the flight direction and below the aircraft by a missile 15' while attacking targets 15L and 15R slightly to the left and to the right of the aircraft. Further, the aircraft also attacks distant targets 15D to the far left of the aircraft. The weapons 15' used for these different, simultaneous attacks are of the so-called scatter warhead projectile type.

Figure 5:
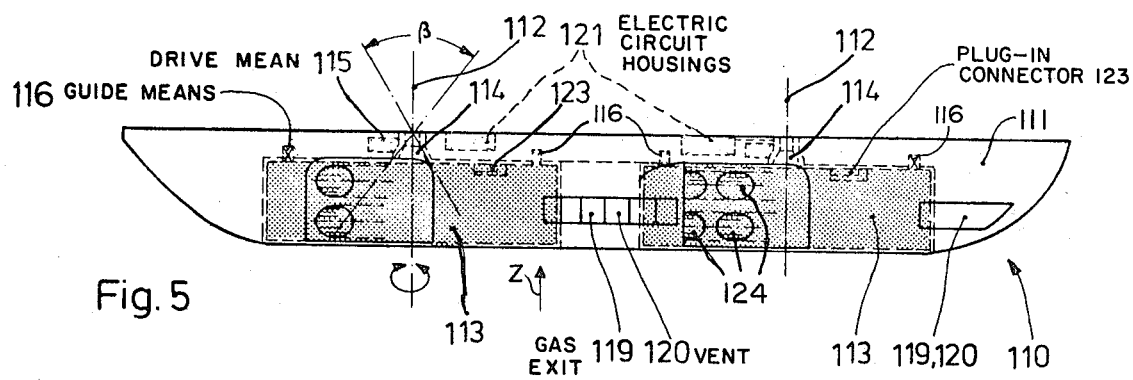
FIG. 5 is a side view of a firing platform.
Figure 7:
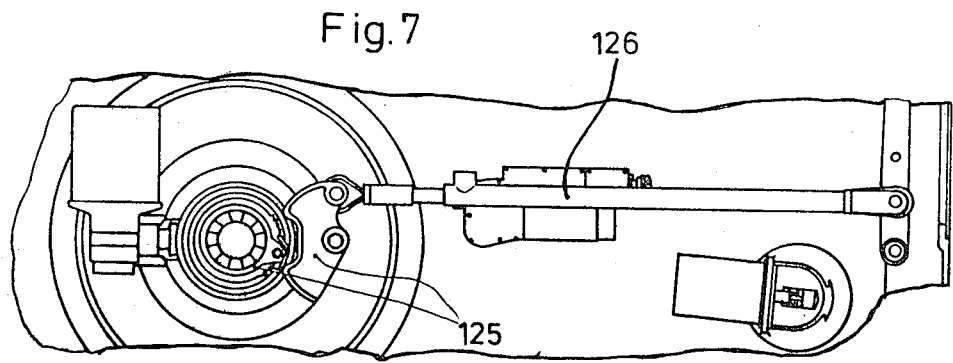
FIG. 7 is a horizontal section along the section line 7—7 in FIG. 6.

FIGS. 4 to 7 illustrate details of the construction of the drum or launching platform according to the invention. The construction of the platform comprises two main components, namely the adapter housing 111 which may be referred to as a rotary drum carrier and the rotary drums 113 proper which are rotatable about vertical axes 112. Each of these platforms 113 comprises a plurality of launching tubes 124 which may be arranged in several tiers as best seen in FIG. 5 illustrating, for example, two tiers of launching tubes 124.

The adapter housing structure 111 is a self supporting metal box having an outer configuration or shape complying with aerodynamic flight requirements.

The dimensions of the housing 111 are determined by the height, the diameter, and the number of rotary drum platforms 113 to be accommodated by the adapter housing structure 111. A pivot bearing 114 is provided for each platform 113. Further, each platform comprises its own drive mechanism 115. The pivot bearing 114 and the drive mechanism 115 are arranged above the respective platform in the housing 111. The pivot bearing 114 simultaneously constitutes a suspension system for the respective platform. Furthermore, the housing comprises guide elements 116 and 116b as well as arresting elements 116a and 117 to arrest the platform in a firing position once it has been rotated. The electrical and electronic components are contained in a housing 121.

The suspension and bearing means 114 are positioned so as to fit the standard suspension means carried by conventional military aircraft. Thus, the present invention may be directly attached to such conventional aircrafts. Accordingly, the structural features of the launching platforms 113 do not depend on the particular type of aircraft because the housing 111 provides with the suspension elements 114 the necessary adaptation to the particular type of aircraft.

The lower portion of the adapter housing 111 encloses the rotary drum containers 113. Said lower portion of the housing 111 is provided with exhaust gas exits 119 and venting means 120. As mentioned, the lateral walls of the housing 111 curve primarily for the aerodynamic enclosing of the rotary drum containers 113. The lateral openings 122 in the housing 111 provide an angular range 122' in which the firing may take place.

Further, the adapter housing 111 may hold one or several rotary drum containers 113 the dimensions of which are determined by the type of weapon to be carried as mentioned above. Thus, the length of the weapons will determine the diameter of the rotary drum and thus also the circumference of these drums. Similarly, the number of launching or firing tubes 124 within each drum will be determined by the type of weapon to be used. The rotary drum itself is a circular metal structure carrying the firing tubes 124 in one or several tiers. The above mentioned suspension bearing 114 cooperates with a suspension stud 114d located in the rotational axis 112. Electrical plug-in type connections 123 are located at the interface between the drum 113 and the housing 111. The guide means 116 form a circular guide path and the arresting means 116a is also a circular notched rail cooperating with the arresting pawls 117. The guide rail 116 and the arresting rail 116a are so constructed that after the rotary drum 113 has been suspended inside the housing 111 the drum rotation will take place exactly and substantially without play in a horizontal plane.

Each firing or launching tube 124 is equipped with its own firing mechanism which may be of conventinal construction including a respective firing fuse.

The above mentioned drive mechanism 115 may drive a pinion or bevel gear 115' meshing with a respective gear 115" secured to the drum proper. The tilting or pivot bearing 114 cooperates with its own locking mechanism 125 (FIG. 7) which is operated by an actuator mechanism 126. The actuator 126 may, for example, be energized in response to the operation of a limit switch 128. All of the just mentioned elements are controlled electronically by electronic means in the housing 121.

An electronic sensor, for example, a light sensitive sensor or a magnetic sensor 127 is arranged in the housing 111 to provide a signal representing the instantaneous angular position of the drum 113 relative to the housing 111. A comparator in the computer control 17 compares a rated position representing signal with the sensed actual position of the drums to supply a respective comparing signal back into the computer control 17.

If desired, the bearing structure 114 and the pivot pin 114a may be constructed for pivoting the entire drum 113 relative to the horizontal plane as indicated by the angle β in FIG. 5. In the embodiment in which the rotary platform is tiltable relative to the horizontal within the angle range β the entire structure including the pivot bearing 114, the pivot member 114a and the guide elements as well as the arresting elements and the sensing means 127 are tilted in unison.

In operation the adapter housing 111 is secured to the standard suspension points on military aircraft, such as a combat aircraft. The electrical connections are conventional plug-in connections and the adapter housing remains connected to the aircraft for the duration of a mission. Prior to inserting the rotary drums 113, 113 into the adapter housing, the weapons are inserted into the launching tubes 124. Thereafter the rotary drum with the weapons in the launching tubes is lifted with a ground loader and again the electrical connections between the housing and the drum are established. Any plug-in connections will take into account a sufficient length of flexible cable to permit for the rotation of the drum relative to the adapter housing within the rotational range as indicated at 122' in FIG. 4. Upon completion of the electrical connections, the drum is hooked with its pivot bearing 114 into the suspension mechanism and locked. At the same time the arresting pawl 117 engages the arresting rail 116a and the guide elements 116b, for example in the form of supporting rollers running on a guide rail, support the container uniformly along the circumference of the guide rail 116. Optical sensors, not shown, may be provided in the adapter housing to obtain a signal indicating the proper arresting of the container inside the housing.

Figure 6:
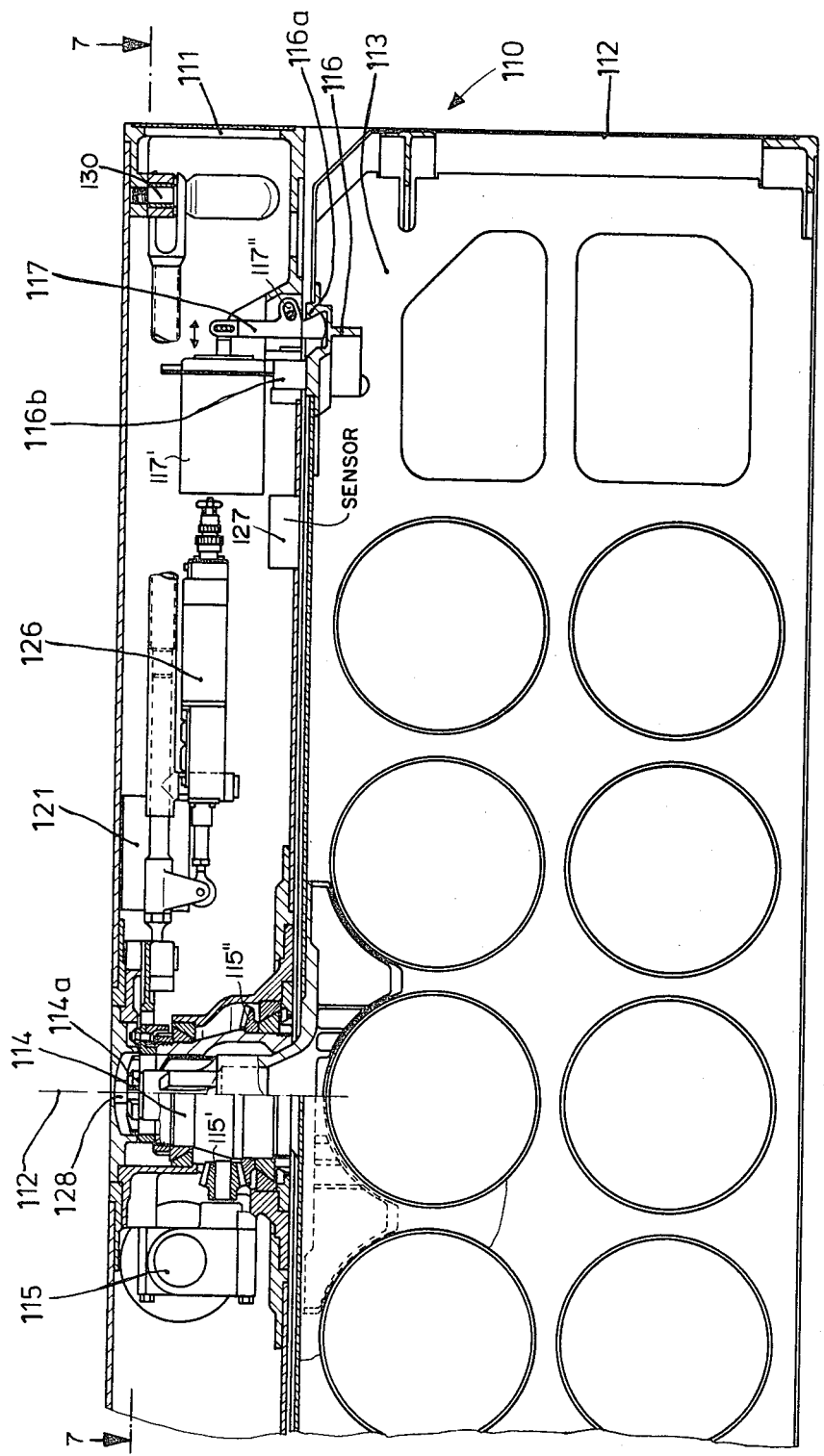
FIG. 6 is a partial view of a firing platform in cross-section taken perpendicularly to the horizontal plane of the aircraft or carrier missile.

Prior to rotating the drum for bringing a launching tube into the firing direction, the arresting pawl 117 is temporarily disengaged from the arresting rail 116a, for example, by means of a solenoid 117' which can move the arresting pawl 117 about the pivot 117" in the direction as indicated by the arrow in FIG. 6. As soon as the drum 113 has reached the desired firing position for the selected launching tube 124, the arresting pawl 117 again engages a respective notch in the arresting rail 116a, whereby the drum is fixed in a firing position.

After completion of a mission the empty or partially empty rotary drum 113 is released from its suspension mechanism 114, 114a and the drum is lowered by means of a specialized, forklift type of apparatus available on the ground and not part of the invention. The electrical plug-in connections release automatically upon the lowering of the drum 113 and the arresting pawls slide out of the arresting rail 116a. The drum may then be refilled to the extent necessary.

Although the above described example embodiments disclose connecting the housing 12 or 111 to the belly-side of the aircraft, it is to be understood, that the present rotary drums and respective housings may also be secured to the wing or to a so-called pylon.

Although the invention has been described with reference to specific example embodiments, it will be appreciated, that it is intended, to cover all modifications and equivalents within the scope of the appended claims.

We claim:

1. An apparatus for the guided attack on multiple targets by means of a weapons carrier combat aircraft, comprising a firing control system including computer means (17) and firing control data input means operatively connected to said computer means, rotary drum means (13, 113) comprising a plurality of rotary drum platforms, housing means (12, 111, 114, 114a) operatively securing said rotary drum means to the underside of said combat aircraft, said housing means comprising firing openings arranged to permit the firing of projectiles substantially in the forward direction and in the lateral direction relative to the direction of movement of said combat aircraft, said rotary drum means being operatively supported for rotation in said housing means, launching tube means in said rotary drum platforms for holding guided projectiles therein, drive means operatively connected to said rotary drum platforms and to said computer means for rotating said rotary drum platforms into a firing position in response to firing control data from said firing control data input means, said computer means and said drive means comprising electronic control means for individually rotating each of said rotary drum platforms independently of any other rotary drum platform so that the projectile most suitable for being directed at the particular target is selected and fired at the target with a defined lateral lead factor whereby the flight trajectory of a weapon may be established independently of the flight trajectory of the combat aircraft and so that the weapon firing may be aimed for high accuracy against multiple or complex ground or air targets without statistical weapon scattering.

2. The apparatus of claim 1, further comprising adapter means (111), said securing means for said rotary drum means comprising rotational axis means (112) supported in said adapter means and guide means for said rotary drum means operatively located in said adapter means.

3. The apparatus of claim 2, wherein said securing means further comprise pivot bearing means (114) arranged in said adapter means, said drive means (115) being arranged in said adapter means, said apparatus further comprising arresting pawl means located in said adapter means and arresting rail means located on said rotary drum means for cooperation with said arresting pawl means for arresting the rotary drum means in any desired firing position, and electronic control means (121) located in said adapter means, said rotary drum means comprising jacket means (118) including exhaust gas exit port means (119) and venting means (120).

4. The apparatus of claim 2, wherein said adapter means comprise suspension hook-up means (130) adapted for cooperation with standardized suspension members of an aircraft whereby said adapter means are exchangeable by other adapter means.

5. The apparatus of claim 2, wherein said rotary platform means comprise jacket means having an aerodynamic configuration and sector shaped firing openings (122) on both sides of said jacket means.

6. The apparatus of claim 2, wherein said securing means for said rotary drum means comprise suspension means (114a) arranged in said rotational axis means (112), said rotary drum means and said adapter means comprising electrical plug-in type connector means (123).

7. The apparatus of claim 1, wherein said rotary platform means comprise a plurality of firing tubes, each of said firing tubes comprising its own electronic firing means.

8. The apparatus of claim 1, wherein said securing means comprise pivot bearing means (114) and arresting means (125) operatively arranged for arresting the respective pivot bearing means.

9. The apparatus of claim 1, further comprising sensor means for ascertaining the rotational position of the respective rotary drum means to provide a corresponding first signal representing the actual position of said rotary drum means, said computer means providing a second signal representing the required position of said rotary drum means, and comparator means for comparing said first and second signals to provide a respective drive control signal for positioning said rotary drum means into the required position.

10. The apparatus of claim 1, wherein said securing means comprise pivot bearing means for tilting the rotational axis of the rotary drum means within a given angular range ($\beta$) relative to the vertical whereby the rotary drum means is tiltable relative to the horizontal plane.

* * * * *